United States Patent
Keating et al.

(10) Patent No.: US 12,430,641 B2
(45) Date of Patent: Sep. 30, 2025

(54) METHOD AND SYSTEM FOR OBFUSCATING ASSET TRANSACTIONS IN A DISTRIBUTED LEDGER

(71) Applicant: Dell Products L.P., Round Rock, TX (US)

(72) Inventors: Matthew Keating, Cork (IE); Alan Barnett, Bandon (IE); Sean Ahearne, Glanmire (IE)

(73) Assignee: Dell Products L.P., Round Rock, TX (US)

( * ) Notice: Subject to any disclaimer, the term of this patent is extended or adjusted under 35 U.S.C. 154(b) by 271 days.

(21) Appl. No.: 17/972,294

(22) Filed: Oct. 24, 2022

(65) Prior Publication Data
US 2024/0135372 A1  Apr. 25, 2024
US 2024/0232875 A9  Jul. 11, 2024

(51) Int. Cl.
*G06Q 20/38*  (2012.01)
*G06Q 20/40*  (2012.01)

(52) U.S. Cl.
CPC ......... *G06Q 20/389* (2013.01); *G06Q 20/383* (2013.01); *G06Q 20/4014* (2013.01)

(58) Field of Classification Search
CPC . G06Q 20/389; G06Q 20/383; G06Q 20/4014
USPC ............................................................ 705/50
See application file for complete search history.

(56) References Cited

U.S. PATENT DOCUMENTS

| | | | | |
|---|---|---|---|---|
| 2020/0242602 A1* | 7/2020 | Jiang | ..................... | G06F 16/27 |
| 2020/0342452 A1* | 10/2020 | Diamond | ........... | G06Q 20/3674 |
| 2020/0358784 A1* | 11/2020 | Khaund | ................ | H04L 9/3239 |
| 2021/0135865 A1* | 5/2021 | Joseph | ................ | H04L 63/0428 |
| 2021/0349854 A1* | 11/2021 | Sun | ....................... | H04L 9/3247 |
| 2023/0161902 A1* | 5/2023 | Dong | .................. | H04L 63/0407 |
| | | | | 726/27 |
| 2023/0360033 A1* | 11/2023 | Dragan | ................. | G06Q 40/02 |

\* cited by examiner

*Primary Examiner* — Courtney P Jones
(74) *Attorney, Agent, or Firm* — Chamberlain, Hrdlicka, White, Williams & Aughtry; Aly Z. Dossa (57) ABSTRACT

Techniques described herein relate to a method for managing transactions in a distributed ledger. The method includes obtaining a transaction request from a client; in response to obtaining the transaction request: verifying client information associated with the client and the transaction request; anonymizing the transaction request to generate an anonymous transaction request; updating client payload mappings based on the anonymous transaction request; shuffling the anonymous transaction request with a batch of requests to generate a shuffle index; assigning the batch of requests to virtual users to generate virtual user assignments; and processing the transaction request using the batch of requests.

20 Claims, 7 Drawing Sheets

METHOD AND SYSTEM FOR OBFUSCATING ASSET TRANSACTIONS IN A DISTRIBUTED LEDGER

BACKGROUND

Computing devices may be used to buy products. Computing devices may generate information associated with transactions. Information associated with the transactions may be sensitive to the user that performed the transaction. The user may desire to prevent the information associated with its transactions from being obtained by others.

SUMMARY

In general, certain embodiments described herein relate to a method for managing transactions in a distributed ledger. The method may include obtaining a transaction request from a client; in response to obtaining the transaction request: verifying client information associated with the client and the transaction request; anonymizing the transaction request to generate an anonymous transaction request; updating client payload mappings based on the anonymous transaction request; shuffling the anonymous transaction request with a batch of requests to generate a shuffle index; assigning the batch of requests to virtual users to generate virtual user assignments; and processing the transaction request using the batch of requests.

In general, certain embodiments described herein relate to a system for managing transactions in a distributed ledger. The system includes a distributed ledger and an obfuscator. The obfuscator includes a processor and memory, and is programmed to obtain a transaction request from a client; in response to obtaining the transaction request: verify client information associated with the client and the transaction request; anonymize the transaction request to generate an anonymous transaction request; update client payload mappings based on the anonymous transaction request; shuffle the anonymous transaction request with a batch of requests to generate a shuffle index; assign the batch of requests to virtual users to generate virtual user assignments; and process the transaction request using the batch of requests.

In general, certain embodiments described herein relate to a non-transitory computer readable medium that includes computer readable program code, which when executed by a computer processor enables the computer processor to perform a method for managing transactions in a distributed ledger. The method may include obtaining a transaction request from a client; in response to obtaining the transaction request: verifying client information associated with the client and the transaction request; anonymizing the transaction request to generate an anonymous transaction request; updating client payload mappings based on the anonymous transaction request; shuffling the anonymous transaction request with a batch of requests to generate a shuffle index; assigning the batch of requests to virtual users to generate virtual user assignments; and processing the transaction request using the batch of requests.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments disclosed herein relate to systems, non-transitory computer readable mediums, and methods for performing obfuscation services for transactions made in a distributed ledger.

In one or more embodiments, traditional systems that include distributed ledger marketplaces such as blockchains may include limited to no privacy for specific users of the system. Each member or node of the distributed ledger may include or otherwise may be able to obtain information associated with the transactions made by every other node in the network. Accordingly, a user of a first node in the distributed ledger may have knowledge of the activities of all other nodes in the distributed ledger network and could use such knowledge for nefarious purposes or to obtain a competitive advantage. As a result, users of the distributed ledger marketplace may significantly sacrifice data privacy in order to make transactions in the distributed ledger marketplace. Users which value data privacy may forgo these distributed ledger marketplaces for more secure marketplaces, potentially losing out on the assets offered and benefits associated with the distributed ledger marketplaces.

To address, at least in part, the aforementioned issues, embodiments disclosed herein provide obfuscation services to improve the privacy of performing transactions in distributed ledger marketplaces. Specifically, a system in accordance with embodiments disclosed herein may apply multiple layers of obfuscation to transaction requests that greatly improve data privacy in these distributed ledger marketplaces. An obfuscator may collect transaction requests from clients and anonymize the transaction requests to generate anonymous transaction requests. The obfuscator may wait until a specific quantity of anonymous transaction requests are included in a batch, and submit the batch of requests all at one time. The obfuscator may further perform shuffle operations to randomize the assignment of anonymous transaction requests to virtual users. Virtual users may be used to submit the anonymous transaction requests on behalf of the clients. The obfuscator may then obtain asset information associated with the batch of anonymous transaction requests provide the asset information to corresponding clients based on multiple mappings maintained by the obfuscator to reverse the obfuscation layers.

Therefore, because of the obfuscation layers employed by the obfuscator, it may be significantly more difficult for members of the distributed ledger marketplace to ascertain information associated with specific transactions of the distributed ledger made by particular clients. As a result, the data privacy of users of the distributed ledger marketplace may be significantly improved through the obfuscation of client transaction requests.

Figure 1A:
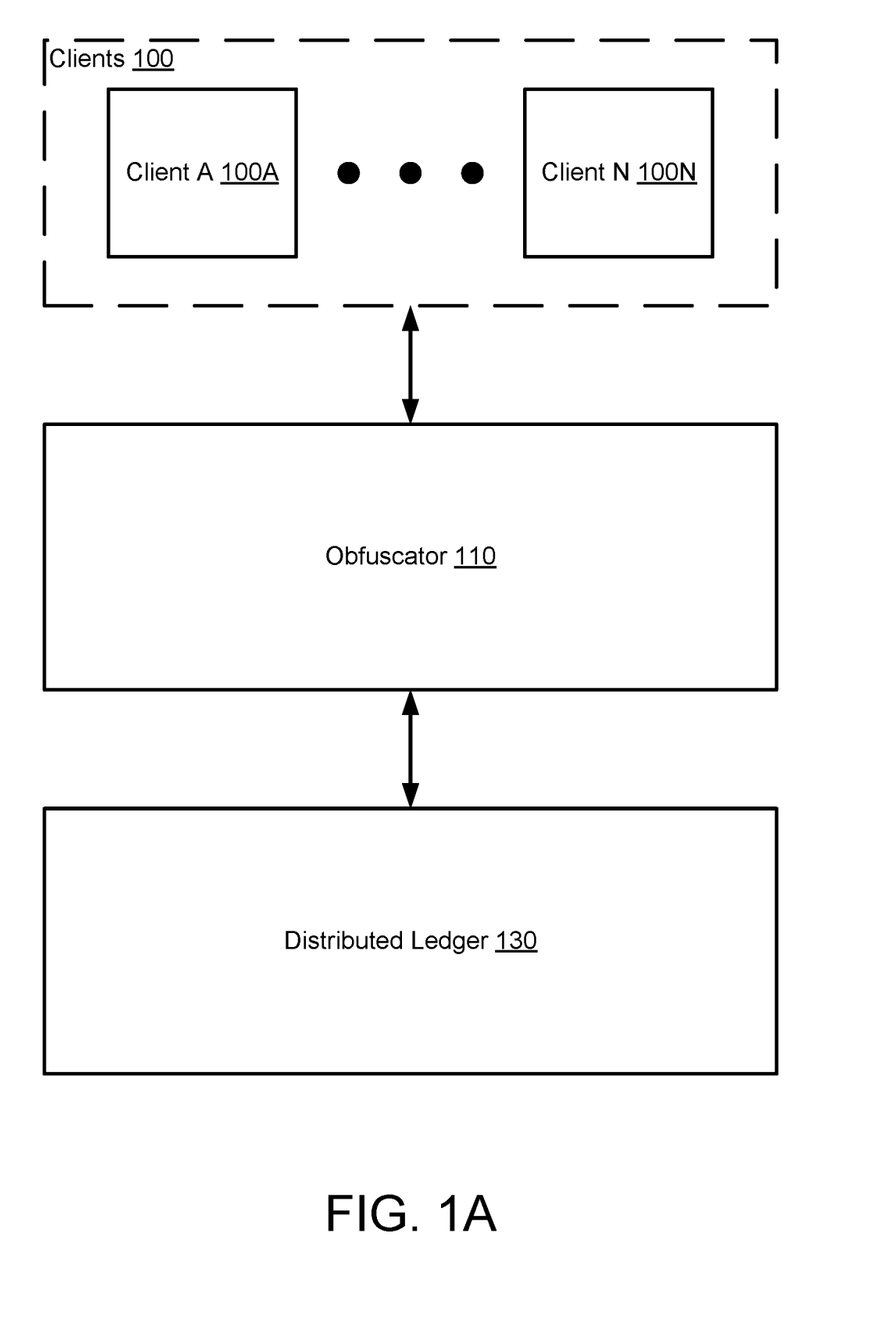
FIG. 1A shows a diagram of a system in accordance with one or more embodiments disclosed herein.

FIG. 1A shows a diagram of a system in accordance with one or more embodiments disclosed herein. The system may include clients (100), an obfuscator (110), and a distributed ledger (130). The clients (100) may submit transaction requests for data assets that may be obtained from the distributed ledger (130) to the obfuscator (110). The obfuscator (110) may perform obfuscation services on the transaction requests to improve the privacy of the clients (100). The obfuscator (110) may also submit the transaction requests to the distributed ledger (130) and provide corresponding asset information to the clients (100) to complete the transaction requests. The components of the system illustrated in FIG. 1A may be operatively connected to each other and/or operatively connected to other entities (not shown) via any combination of wired (e.g., Ethernet) and/or wireless networks (e.g., local area network, wide area network, Internet, etc.) without departing from embodiments disclosed herein. Each component of the system illustrated in FIG. 1A is discussed below.

In one or more embodiments disclosed herein, the clients (100) include any quantity of clients (100). For example, the clients (100) may include client A (100A) and client N (100N). The clients (100) may include a single client (e.g., 100A) or multiple clients (e.g., 100A, 100N) without departing from embodiments disclosed herein.

In one or more embodiments, the clients (100) may be implemented using one or more computing devices. A computing device may be, for example, mobile phones, tablet computers, laptop computers, desktop computers, servers, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described herein and/or all, or a portion, of the methods illustrated in FIGS. 2A-2B. The clients (100) may be implemented using other types of computing devices without departing from embodiments disclosed herein. For additional details regarding computing devices, refer to FIG. 4.

In one or more embodiments, the clients (100) may be implemented using logical devices without departing from embodiments disclosed herein. For example, the clients (100) may include virtual machines that utilize computing resources of any number of physical computing devices to provide the functionality of the clients (100). The clients (100) may be implemented using other types of logical devices without departing from the embodiments disclosed herein.

In one or more embodiments, the clients (100) may include the functionality to, or may be otherwise programmed or configured to, to obtain obfuscation services from the obfuscator (110). As part of obtaining obfuscation services, users of the clients (100) may submit transaction requests to the obfuscator (110). In return, the clients (100) may obtain asset information associated with data assets corresponding to submitted transaction requests. The clients may use the asset information to obtain the data asset acquired from the distributed ledger (130). The clients (100) may include the functionality to perform all, or a portion of, the methods of FIGS. 2A-2B. The clients (100) may include other and/or additional functionalities without departing from embodiments disclosed herein.

In one or more embodiments, the obfuscator (110) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the obfuscator (110) described herein and/or all, or a portion, of the methods illustrated in FIGS. 2A-2B. The obfuscator (110) may be implemented using other types of computing devices without departing from the embodiments disclosed herein. For additional details regarding computing devices, refer to FIG. 4.

The obfuscator (110) may be implemented using logical devices without departing from the embodiments disclosed herein. For example, the obfuscator (110) may include virtual machines that utilize computing resources of any number of physical computing devices to provide the functionality of the obfuscator (110). The obfuscator (110) may be implemented using other types of logical devices without departing from the embodiments disclosed herein.

In one or more embodiments, the obfuscator (110) may include the functionality to, or otherwise be programmed or configured to, perform obfuscation services the clients (100). The obfuscator (110) may include the functionality to perform all, or a portion of, the methods discussed in FIGS.

2A-2B. The obfuscator (110) may include other and/or additional functionalities without departing from embodiments disclosed herein. For additional information regarding the components of the obfuscator (110), refer to FIG. 1B. For additional information regarding the functionality of the obfuscator (110), refer to FIGS. 2A-2B.

In one or more embodiments, the obfuscator (110) may execute in a trusted execution environment such as a secure enclave. The obfuscator (110) and its components may be executed on isolated hardware with memory encryption to improve the data security associated with the obfuscator (110). In other words, the obfuscator may execute as a black box from the perspective of other entities, which may not have access to the data stored within the obfuscator or the processes (e.g., computer instructions) executing therein. As a result, the data privacy of the obfuscator (110) may be further improved.

In one or more embodiments, the distributed ledger (130) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the distributed ledger (130) described herein and/or all, or a portion, of the methods illustrated in FIGS. 2A-2B. The distributed ledger (130) may be implemented using other types of computing devices without departing from the embodiments disclosed herein. For additional details regarding computing devices, refer to FIG. 4.

The distributed ledger (130) may be implemented using logical devices without departing from the embodiments disclosed herein. For example, the distributed ledger (130) may be an application or virtual machine that utilizes computing resources of any number of physical computing devices to provide the functionality of the distributed ledger (130). The distributed ledger (130) may be implemented using other types of logical devices without departing from the embodiments disclosed herein.

In one or more embodiments, the distributed ledger (130) may include a distributed network (e.g., a peer-to-peer network) that includes multiple nodes (e.g., computing devices such as the clients (100)) that are geographically distributed across many sites. The distributed ledger (130) may include the functionality to implement a marketplace where assets may be transferred to entities (e.g., the clients (100), or other nodes not shown) which purchase the assets based on transaction requests. The assets may include data assets and/or physical assets. The data assets may refer to digital information such as cryptocurrencies, database data, software, and other and/or additional types of digital assets without departing from embodiments disclosed herein. The physical assets may be any physical product that may be purchased and sold, such as GPUs, CPUs, computers, clothes, property, etc. without departing from embodiments disclosed herein.

In one or more embodiments, each node may include a copy of distributed ledger information. The distributed ledger (130) may replicate, share, or otherwise ensure distributed ledger information is up to date and accurate on all nodes included in the distributed network using any appropriate method of data distribution (e.g., consensus algorithms) without departing from embodiments disclosed herein. The distributed ledger information may include asset identifiers, price information, transaction requests, node identifiers, timestamps, asset information (discussed below), security information (e.g., public and private keys, certificates, etc.) and other and/or additional information associated with the distributed ledger (130) without departing from embodiments disclosed herein. The distributed ledger (130) may be implemented as, for example, a permissioned blockchain or a permissionless blockchain. Other types of distributed ledgers may be implemented without departing from embodiments disclosed herein. In one or more embodiments, each entity (e.g., a client (100)) included in the distributed network of the distributed ledger (130) may have access to at least a portion of the distributed ledger information, significantly reducing the privacy of clients (100) when conducting transactions using the distributed ledger (130) without obtaining obfuscation services from the obfuscator (110).

Figure 2A:
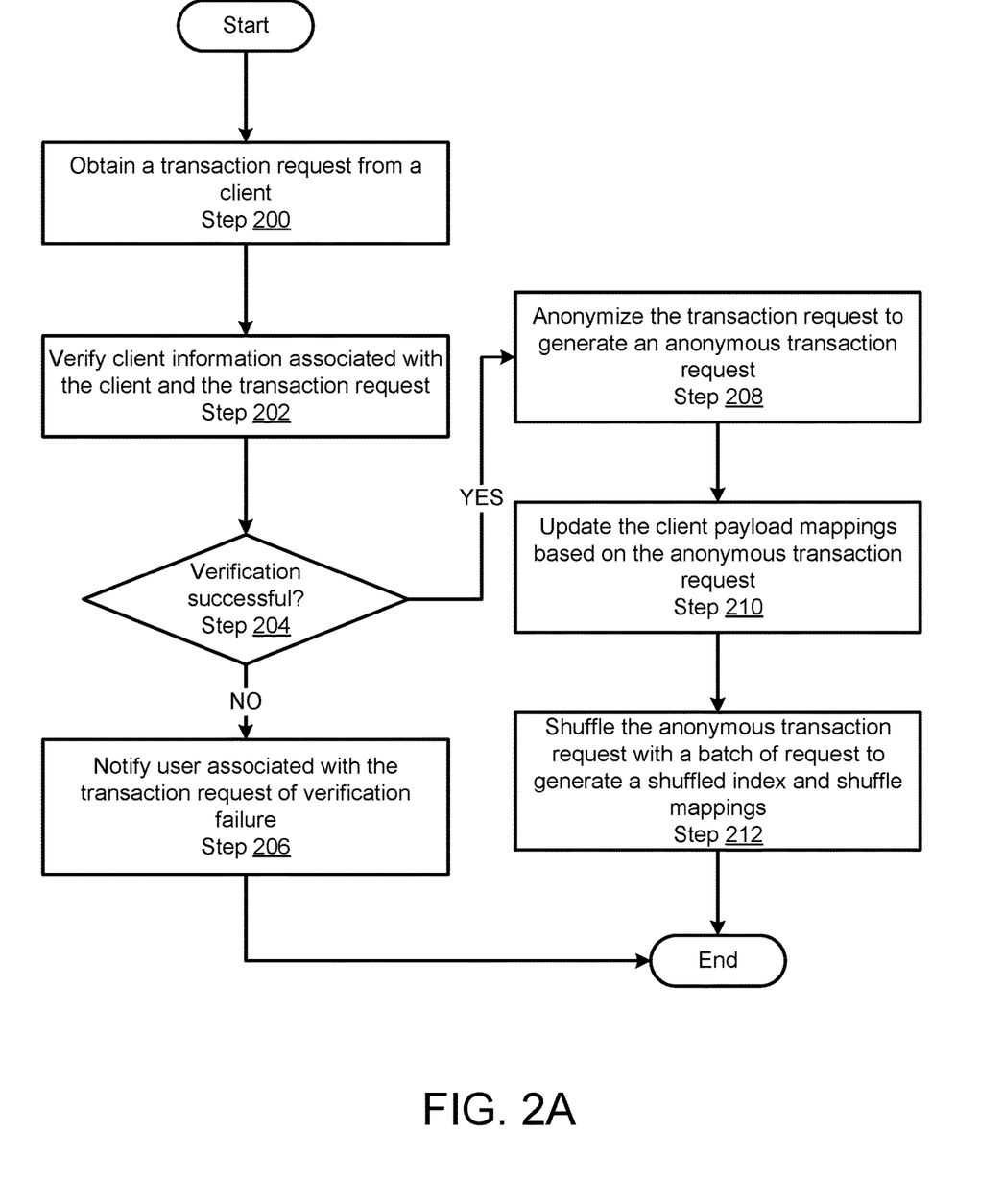
FIGS. 2A-2B show flowcharts of a method for processing transaction requests for a distributed ledger using obfuscation in accordance with one or more embodiments disclosed herein.
Figure 2B:
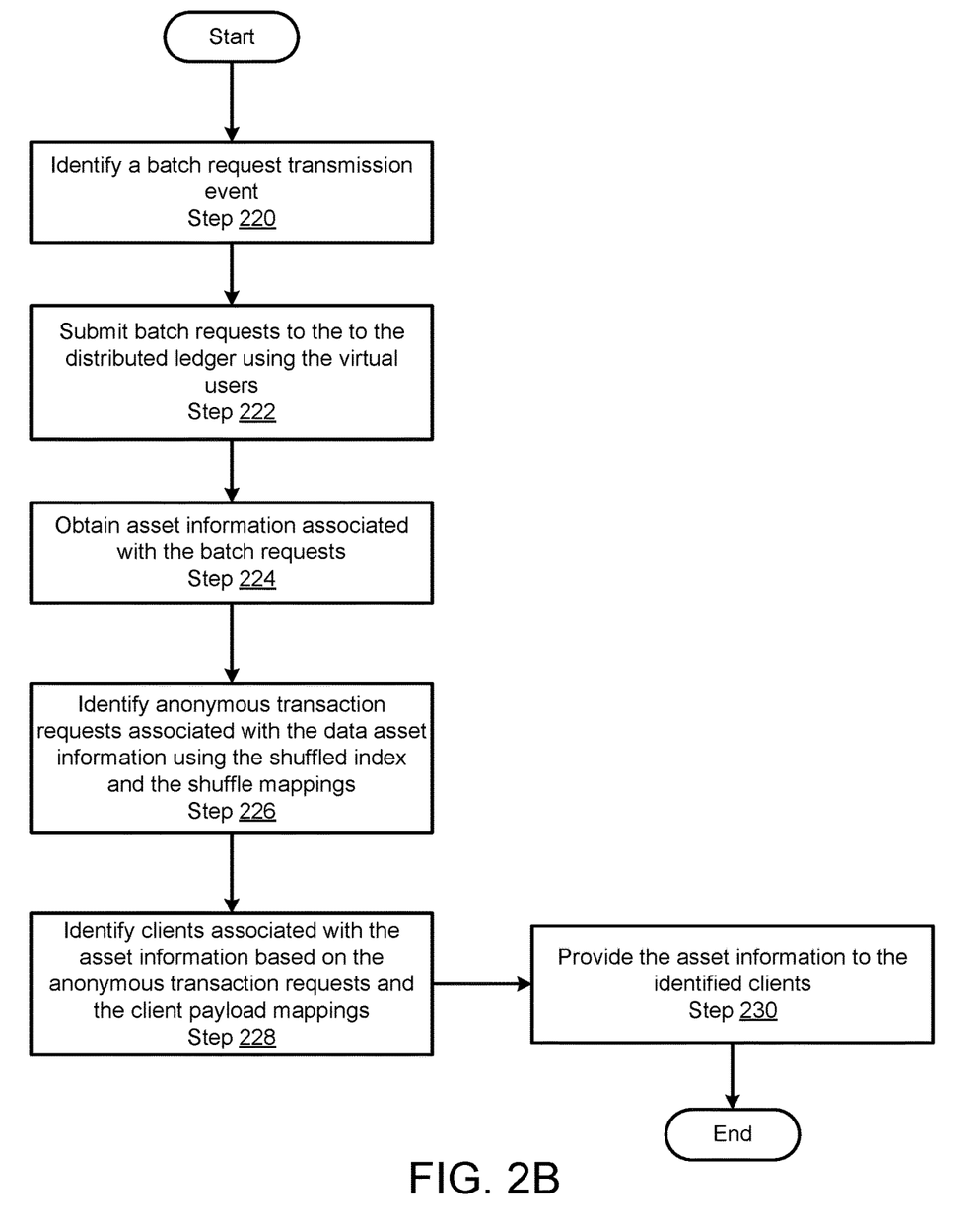

In one or more embodiments, the distributed ledger (130) may include may include the functionality to perform all, or a portion of, the methods discussed in FIGS. 2A-2B. The distributed ledger (130) may include other and/or additional functionalities without departing from embodiments disclosed herein.

Although the system of FIG. 1A is shown as having a certain number of components (e.g., 100, 100A, 100N, 110, 130), in other embodiments disclosed herein, the system may have more or fewer components. For example, the functionality of each component described above may be split across components or combined into a single component. Further still, each component may be utilized multiple times to carry out an iterative operation.

Figure 1B:
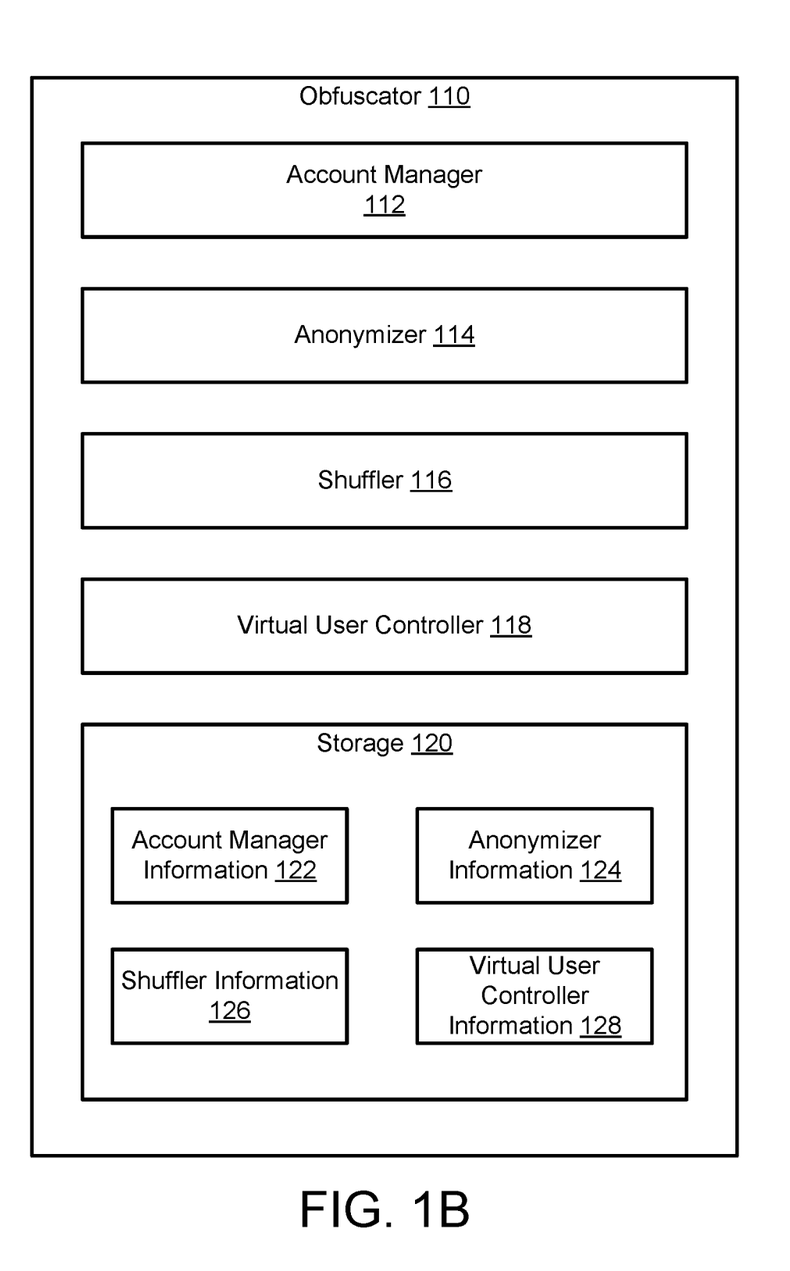
FIG. 1B shows a diagram of an obfuscator in accordance with one or more embodiments disclosed herein.

FIG. 1B shows a diagram of an obfuscator in accordance with one or more embodiments disclosed herein. The obfuscator (110) may be an embodiment of the obfuscator (110, FIG. 1A) discussed above. As discussed above, the obfuscator (110) may include the functionality to perform obfuscation services. To perform the obfuscation services, the obfuscator (110) may include an account manager (112), an anonymizer (114), a shuffler (116), a virtual user controller (118), and storage (120). The obfuscator (110) may include other, additional, and/or fewer components without departing from embodiments disclosed herein. Each of the aforementioned components of the obfuscator (110) is discussed below.

In one or more embodiments disclosed herein, the account manager (112) is implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the account manager (112) described throughout this Detailed Description.

In one or more embodiments disclosed herein, the account manager (112) is implemented as computer instructions, e.g., computer code, stored on a storage that when executed by a processor of the obfuscator (110) causes the obfuscator (110) to provide the functionality of the account manager (112) described throughout this Detailed Description.

In one or more embodiments, the account manager (112) includes the functionality to, or is otherwise configured to, perform a portion of the obfuscation services of the obfuscator (110). The portion of the obfuscation services performed by the account manager (112) may include maintaining account manager information (discussed below) and performing verification of transaction requests (discussed below). The account manager (112) may include the functionality to perform all, or a portion thereof, the steps in the methods depicted in FIGS. 2A-2B. The account manager (112) may include, or be configured to perform, other and/or additional functionalities without departing from embodiments disclosed herein. For additional information regarding the functionality of the account manager (112), refer to FIGS. 2A-2B.

In one or more embodiments disclosed herein, the anonymizer (114) is implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the anonymizer (114) described throughout this Detailed Description.

In one or more embodiments disclosed herein, the anonymizer (114) is implemented as computer instructions, e.g., computer code, stored on a storage (e.g., 320) that when executed by a processor of the obfuscator (110) causes the obfuscator (110) to provide the functionality of the anonymizer (114) described throughout this Detailed Description.

In one or more embodiments, the anonymizer (114) includes the functionality to, or is otherwise configured to, perform a portion of the obfuscation services of the obfuscator (110). The portion of the obfuscation services performed by the anonymizer (114) may include generating anonymous transaction requests using transaction requests, maintaining anonymizer information, and identifying clients associated with asset information (discussed below). The anonymizer (114) may include the functionality to perform all, or a portion thereof, the steps in the methods depicted in FIGS. 2A-2B. The anonymizer (114) may include or be configured to perform other and/or additional functionalities without departing from embodiments disclosed herein. For additional information regarding the functionality of the anonymizer (114), refer to FIGS. 2A-2B.

In one or more embodiments disclosed herein, the shuffler (116) is implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the shuffler (116) described throughout this Detailed Description.

In one or more embodiments disclosed herein, the shuffler (116) is implemented as computer instructions, e.g., computer code, stored on a storage that when executed by a processor of the obfuscator (110) causes the obfuscator (110) to provide the functionality of the shuffler (116) described throughout this Detailed Description.

In one or more embodiments, the shuffler (116) includes the functionality to, or is otherwise configured to, perform a portion of the obfuscation services of the obfuscator (110). The portion of the obfuscation services performed by the shuffler (116) may include generating a shuffle index (discussed below) and shuffle mappings (discussed below) in a shuffle operation and identifying anonymous transaction requests associated with asset information. The shuffler (116) may include the functionality to perform all, or a portion thereof, the steps in the methods depicted in FIGS. 2A-2B. The shuffler (116) may include, or be configured to perform, other and/or additional functionalities without departing from embodiments disclosed herein. For additional information regarding the functionality of the shuffler (116), refer to FIGS. 2A-2B.

In one or more embodiments disclosed herein, the virtual user controller (118) is implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the virtual user controller (118) described throughout this Detailed Description.

In one or more embodiments disclosed herein, the virtual user controller (118) is implemented as computer instructions, e.g., computer code, stored on a storage (e.g., 320) that when executed by a processor of the obfuscator (110) causes the obfuscator (110) to provide the functionality of the virtual user controller (118) described throughout this Detailed Description.

In one or more embodiments, the virtual user controller (118) includes the functionality to, or is otherwise configured to, perform a portion of the obfuscation services of the obfuscator (110). The portion of the obfuscation services performed by the virtual user controller (118) may include generating and maintaining virtual users, identifying batch request transmission events, and submitting batches of anonymous transaction requests using virtual users and the shuffle index. The virtual user controller (118) may include the functionality to perform all, or a portion thereof, the steps in the methods depicted in FIGS. 2A-2B. The virtual user controller (118) may include or be configured to perform other and/or additional functionalities without departing from embodiments disclosed herein. For additional information regarding the functionality of the virtual user controller (118), refer to FIGS. 2A-2B.

In one or more embodiments, the storage (120) may be implemented using one or more volatile or non-volatile storages or any combination thereof. The storage (120) may include the functionality to, or otherwise be configured to, store and provide information that may be used by the obfuscator (110) and the components thereof (e.g., 112, 114, 116, 118) to perform obfuscation services. The information stored in the storage (120) may include account manager information (122), anonymizer information (124), shuffler information (126), and virtual user controller information (128). The storage (120) may store other and/or additional information without departing from embodiments disclosed herein. Each of the aforementioned types of information stored in the storage (120) is discussed below.

In one or more embodiments, the account manager information (122) may include one or more data structures that include information associated with the clients (100, FIG. 1A). The account manager information (122) may include entries associated with each client (100). An entry may include client information associated with the corresponding client obtained from the client. The client information may include a client identifier, communication information (e.g., network address, IP address, MAC address, security keys, certificates, etc.), user information, and/or other information associated with the client. The user information may include one or more user identifiers, an organization identifier, and/or other information associated with the user without departing from embodiments disclosed herein. An entry may further include the available monetary funds associated with the client that the obfuscator may use to submit transactions. The clients (100) may submit funds using any appropriate method of secure money transfers (e.g., an out-of-band network communication channel) without departing from embodiments disclosed herein. The account manager information may include other and/or additional information without departing from embodiments disclosed herein.

The account manager (112) may use the account manager information (122) to perform verification of transaction requests and to transmit asset information to the clients. The account manager information (122) may be used for other and/or additional purposes without departing from embodiments disclosed herein.

In one or more embodiments, the anonymizer information (124) may include one or more data structures that include client payload information. The client payload information may include mappings between clients and anonymous transaction requests. In other words, the client payload mappings may include a list of client identifiers and, for each client identifier, the anonymous transaction request identifiers corresponding to the client. The anonymizer information (124) may include other and/or additional information without departing from embodiments disclosed herein. The anonymizer information (124) may be generated, deleted, or otherwise maintained by the anonymizer (114). The anonymizer information (124) may be used by the anonymizer (114) to identify clients associated with asset information based on corresponding anonymous transaction requests. The anonymizer information (124) may be used for other and/or additional purposes without departing from embodiments disclosed herein.

In one or more embodiments, the shuffler information (126) may include data structures that include a physical index, a logical index, a shuffled index, and shuffle mappings. For additional information regarding the physical index, the logical index, the shuffled index, and the shuffle mappings, refer to Step 212 of FIG. 2A. The shuffler information (126) may include other and/or additional information regarding the shuffler (116) without departing from embodiments disclosed herein. The shuffler information (126) may be generated, deleted, or otherwise maintained by the shuffler (116). The shuffler information (126) may be used by the shuffler (116) to perform shuffler operations and to identify asset information associated with anonymous transaction requests. The shuffler information (126) may be used for other and/or additional purposes without departing from embodiments disclosed herein.

In one or more embodiments, the virtual user controller information (128) may include one or more data structures that include information associated with virtual users. The information may include virtual user identifiers, configurable batch request threshold, the configurable time period from the receipt of the first anonymous transaction request (e.g., a request transmission delay period), a count of anonymous transaction requests stored in the storage, and the time since the receipt of the first anonymous transaction request. The virtual user controller information (128) may include other and/or additional information associated with the virtual users without departing from embodiments disclosed herein. A virtual user (not shown) may be a placeholder account used by the virtual user controller that submits anonymous transaction requests and payments on behalf of the clients (100, FIG. 1A). A virtual user may be assigned any number of anonymous transaction requests associated with any number of clients (100, FIG. 1A) as specified by the shuffled index without departing from embodiments disclosed herein. The virtual user controller information (128) may be generated, deleted, or otherwise maintained by the virtual user controller (118). The virtual user controller information (128) may be used by the virtual user controller (118) to identify batch request transmission events and submit anonymous transaction requests using virtual users. The virtual user controller information (128) may be used for other and/or additional purposes without departing from embodiments disclosed herein.

While the data structures (e.g., 122, 124, 126, 128) are illustrated as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (120), any of the aforementioned data structures may be stored in different locations (e.g., in storage of other computing devices) and/or spanned across any number of computing devices without departing from embodiments disclosed herein. The data structures of the storage (120) may be implemented using, for example, lists, linked lists, tables, unstructured data, databases, etc. While illustrated in FIG. 1B as being stored locally, the data structures (e.g., 122, 124, 126, 128) may be stored remotely and may be distributed across any number of devices without departing from the invention.

FIGS. 2A-2B show flowcharts of methods in accordance with one or more embodiments disclosed herein. Turning now to FIG. 2A, FIG. 2A shows a flowchart of a method for obtaining transaction requests for performing obfuscation services in accordance with one or more embodiments disclosed herein. The method shown in FIG. 2A may be performed by, for example, the obfuscator (e.g., 110 FIG. 1A). Other components of the system in FIGS. 1A-1B may perform all, or a portion, of the method of FIG. 2A without departing from the scope of the embodiments described herein.

While FIG. 2A is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 200, a transaction request is obtained from a client. In one or more embodiments, the client sends the transaction request to the obfuscator. The request may be sent to the obfuscator using any appropriate method of data transmission without departing from the invention. For example, the request may be sent as part of a message including multiple network packets through one or more network devices that operatively connect the client to the obfuscator. The transaction request may be obtained from the client via other and/or additional methods without departing from embodiments disclosed herein.

In one or more embodiments, the transaction request may refer to one or more data structures that includes transaction information. The transaction information may include one or more asset identifiers corresponding with assets that the user of the client desires to acquire and client information associated with the client. The client information may include a client identifier, communication information (e.g., network address, IP address, MAC address, security keys, certificates, etc.), user information, and/or other information associated with the client. The user information may include one or more user identifiers, an organization identifier, and/or other information associated with the user without departing from embodiments disclosed herein. The transaction request may include other and/or additional information associated with the transaction without departing from embodiments disclosed herein.

In Step 202, client information associated with the client and the transaction request is verified. In one or more embodiments, the account manager of the obfuscator may verify the client information associated with the client by comparing the client information included in the transaction request to corresponding client information maintained by the account manager in the account manager information. As a result, the account manager may ensure that no nefarious actors are attempting to perform a transaction on behalf of the client. In addition to verifying the client information, the account manager may also check the available monetary funds associated with the client in the account manager information to confirm that there is sufficient monetary funds to complete the transaction. Client information associated with the client and the transaction request may be verified via other and/or additional methods without departing from embodiments disclosed herein.

In Step 204, a determination is made as to whether the verification is successful. As discussed above, the account manager of the obfuscator may compare the client information included in the transaction request to corresponding client information maintained by the account manager in the account manager information. Additionally, the account manager of the obfuscator may include knowledge of the cost of the transaction associated with the transaction request (e.g., obtained from the distributed ledger) and compare the cost with the available funds associated with the client. In one or more embodiments disclosed herein, if either the client information in the transaction request does not match the client information included in the account manager or the available funds are less than the cost of the transaction, the account manager may determine that the verification is unsuccessful. In one or more embodiments disclosed herein, if both the client information in the transaction request matches the client information included in the account manager and the available funds match or exceed the cost of the transaction, the account manager may determine that the verification is successful. The determination as to whether the verification is successful may be made via other and/or additional methods without departing from embodiments disclosed herein.

In Step 206, the client associated with the transaction request is notified of the verification failure. In one or more embodiments, the account manager of the obfuscator may send a notification to the client. The notification may indicate that the transaction request verification was not successful. The notification may further specify that (i) the client information of the transaction request did not match the corresponding client information included in the account manager information and/or (ii) that the client includes insufficient funds to complete the transaction request. The notification may include other and/or additional information without departing from embodiments disclosed herein. Upon receipt of the notification, the client may (i) update its client information in the account manager information and resend the transaction request, (ii) provide the additional funds necessary to complete the transaction and resubmit the transaction request, and/or (iii) be alerted of an unwarranted transaction attempt. The notification may be sent to the client using any appropriate method of data transmission without departing from the invention. For example, the notification may be sent as part of a message including multiple network packets through one or more network devices that operatively connect the client to the obfuscator.

The client associated with the transaction request may be notified of the verification failure via other and/or additional methods without departing from embodiments disclosed herein.

In one or more embodiments disclosed herein, the method ends following Step 206.

In Step 208, the transaction request is anonymized to generate an anonymous transaction request. In one or more embodiments, the anonymizer of the obfuscator may anonymize the transaction request to generate an anonymous transaction request. To generate the anonymous transaction request, the anonymizer may remove the client information from the transaction request. As a result, the anonymous transaction request may not include any information referencing the client which originated the transaction request. The anonymizer may assign an anonymous request identifier to the generated anonymous request and include a copy of the anonymous transaction request identifier in the anonymous transaction request. The transaction request may be anonymized to generate an anonymous transaction request via other and/or additional methods without departing from embodiments disclosed herein.

In Step 210, the client payload mappings are updated based on the anonymous transaction request. In one or more embodiments, the anonymizer of the obfuscator may update the client payload mappings based on the anonymous transaction request. To update the client payload mapping, the anonymizer may map the client identifier associated with the transaction request to the anonymous transaction identifier associated with the anonymous transaction request. The client payload mappings may be updated based on the anonymous transaction request via other and/or additional methods without departing from embodiments disclosed herein.

In Step 212, the anonymous transaction request is shuffled with a batch of requests to generate a shuffled index and shuffle mappings. In one or more embodiments, the shuffler of the obfuscator may shuffle the anonymous transaction request with the batch of requests to generate a shuffle index. The shuffler may use any appropriate method of shuffling the anonymous transaction with the batch of requests without departing from embodiments disclosed herein.

As an example, the shuffler may assign the anonymous transaction request and the batch of requests (e.g., other anonymous transaction requests) to multiple virtual users. Each anonymous transaction request may be assigned to a virtual user, and each virtual user may be assigned multiple anonymous transaction requests. There may be any quantity of virtual users and each virtual user may be assigned any quantity of anonymous transaction requests without departing from embodiments disclosed herein. The physical data associated with virtual user and the corresponding anonymous transaction requests may be stored in a physical index. A logical index may specify the virtual user identifiers and anonymous transaction request identifiers and include references (e.g., pointers) to the corresponding data in the physical index. The shuffle operation may be performed on the logical index to swap the identifiers of both the virtual users and the batch of anonymous transaction requests associated with the references to generate a shuffled index.

As a result, the identifiers associated with the references (e.g., the virtual users and their assigned anonymous transaction requests) may now be randomized. The shuffler may generate shuffle mappings that specify the swaps or changes that occurred during the shuffle operation and may be used to later revert the shuffled logical index back to the previous logical index. The shuffler may then assign the anonymous transaction requests included in the shuffled index to virtual users. Thus, a virtual user submitting anonymous transaction request using the shuffled logical index may be submitting a random anonymous transaction request that does not correspond to the anonymous transaction request identifier included in the shuffled index. Such shuffling operations further improve the privacy of performing transactions in the distributed ledger through randomization.

In one or more embodiments, the shuffler may shuffle anonymous transaction request and the batch of requests any number of times. In one or more embodiments disclosed herein, the shuffler may shuffle the batch of requests each time a new anonymous transaction request is obtained. In other embodiments disclosed herein, the shuffler may shuffle the batch of requests once following the identification of a batch request transmission event (e.g., Step 220, FIG. 2B). The anonymous transaction request may be shuffled with the batch of requests to generate a shuffled index and shuffle mappings via other and/or additional methods without departing from embodiments disclosed herein.

In one or more embodiments disclosed herein, the method ends following Step 212.

Turning now to FIG. 2B, FIG. 2B shows a flowchart of a method for processing anonymous transaction request to perform obfuscation services in accordance with one or more embodiments disclosed herein. The method shown in FIG. 2B may be performed by, for example, the obfuscator (e.g., 110, FIG. 1A). Other components of the system in FIGS. 1A-1B may perform all, or a portion, of the method of FIG. 2B without departing from the scope of the embodiments described herein.

While FIG. 2B is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 220, a batch request transmission event is identified. In one or more embodiments, the obfuscator may identify the batch request transmission event. In one or more embodiments, the batch transmission event may include the number of batch requests exceeding a configurable batch request threshold. The virtual user manager of the obfuscator may monitor the number of anonymous transaction requests included in the batch of requests. When the number of anonymous transaction requests exceeds the configurable batch request threshold, then the virtual user manager identifies the batch request transmission event.

In other embodiments, the virtual user manager may wait a configurable amount of time after obtaining the first anonymous transaction request in the batch of requests. Such a configurable amount of time may be referred to as a transaction request transmission delay period. Once the amount of time since obtaining the first anonymous transaction request exceeds the configurable amount of time, the virtual user manager may identify the batch request transmission event.

In yet other embodiments, the batch request transmission event may include both the number of batch requests exceeding a configurable batch request threshold and waiting a configurable amount of time after obtaining the first anonymous transaction request in the batch of requests. In other words, the virtual users may not submit the batch of requests until the quantity of anonymous transaction requests exceeds the configurable batch threshold and amount of time since the first anonymous transaction request is received exceeds the configurable amount of time after obtaining the first anonymous transaction request.

The batch request transmission event may be identified via other and/or additional methods without departing from embodiments disclosed herein.

In Step 222, the batch requests are submitted to the distributed ledger using the virtual users. In one or more embodiments, the virtual users submit the batch requests to the distributed ledger. Each virtual user may use one or more throwaway payment systems (e.g., virtual one-time cards) generated using the available client funds to pay for the anonymous transaction requests. The virtual users may submit the batch requests and the corresponding funds necessary to complete the transactions to the distributed ledger using any appropriate method of data transmission without departing from embodiments disclosed herein. For example, each anonymous transaction request may be sent as part of a message including multiple network packets through one or more network devices that operatively connect the virtual user to the distributed ledger. The batch of requests may be submitted to the distributed ledger via other and/or additional methods without departing from embodiments disclosed herein.

In Step 224, asset information associated with the batch requests are obtained. In one or more embodiments, the distributed ledger, or a component therein, may send the asset information associated with the batch of requests back to the virtual users of the obfuscator. In response to obtaining each anonymous transaction request, the distributed ledger may confirm that sufficient monetary funds accompany the anonymous transaction request and obtain asset information associated with the one or more assets targeted by the anonymous transaction request. The distributed ledger may then send the asset information back to the virtual user of the obfuscator that sent the anonymous transaction request. Asset information may be sent the virtual users of the obfuscator using any appropriate method of data transmission without departing from embodiments disclosed herein. For example, asset information may be sent as part of messages that includes multiple network packets through one or more network devices that operatively connect the virtual users to the distributed ledger. The asset information associated with the batch of requests may be obtained via other and/or additional methods without departing from embodiments disclosed herein.

In one or more embodiments, the asset information may refer to one or more data structures that includes information that a client may use to access the one or more assets acquired through the anonymous transaction request. The asset information may include, for example, network address, IP address, MAC address, security keys, certificates, confirmation numbers, shipping address forms, physical geolocations for pickup, and other and/or additional information that the clients and/or users of the clients may use to access the purchased assets.

In Step 226, the anonymous transaction requests associated with the asset information are identified using the shuffled index and the shuffle mappings. As discussed above, the shuffled index may refer to a logical index that includes swapped or otherwise randomized virtual user identifiers and anonymous transaction request identifiers associated with references to the corresponding physical data of the anonymous transaction requests stored in a physical index. Also as discussed above, the shuffle mappings may specify the changes to the original logical index that were used to generate the shuffled logical index. In one or more embodiments, the shuffler of the obfuscator may use the shuffle mappings to revert the shuffled logical index back to the original logical index. The shuffler may then use the original logical index to accurately identify the portions of the asset information associated with each correct anonymous transaction request. The anonymous transaction requests associated with the asset information may be identified using he shuffled index and the shuffle mappings via other and/or additional methods without departing from embodiments disclosed herein.

In Step 228, the clients associated with the asset information are identified based on the anonymous transaction requests and the client payload mappings. In one or more embodiments, the anonymizer of the obfuscator may identify the clients associated with each asset information using the client payload mappings. After identifying the anonymous transaction request associated with each asset information, the anonymizer may use the client payload mappings to identify the client associated with each anonymous transaction request. As discussed above, the client payload mappings may specify which client is associated with each anonymous transaction request. In turn, the anonymizer may then identify the clients associated with each portion of the asset information based on the anonymous transaction requests associated with each client. The clients associated with the asset information may be identified based on the anonymous transaction requests and the client payload mappings via other and/or additional methods without departing from embodiments disclosed herein.

In Step 230, the asset information is provided to the identified clients. In one or more embodiments, the account manager may provide the asset information associated with each client to the clients. Asset information may be sent the clients using any appropriate method of data transmission without departing from embodiments disclosed herein. For example, asset information may be sent as part of messages that includes multiple network packets through one or more network devices that operatively connect the account manager of the obfuscator to the clients. In response to obtaining the asset information, the clients may use the asset information to access the corresponding acquired assets. The asset information may be provided to the clients obtained via other and/or additional methods without departing from embodiments disclosed herein.

In one or more embodiments, following Step 230, the obfuscator may clear the physical index of the batch of anonymous transaction requests, discard the client payload mappings, the shuffled index, and the shuffle mappings in preparation for subsequent obfuscation services for new transaction requests.

In one or more embodiments disclosed herein, the method ends following Step 230.

Figure 3A:
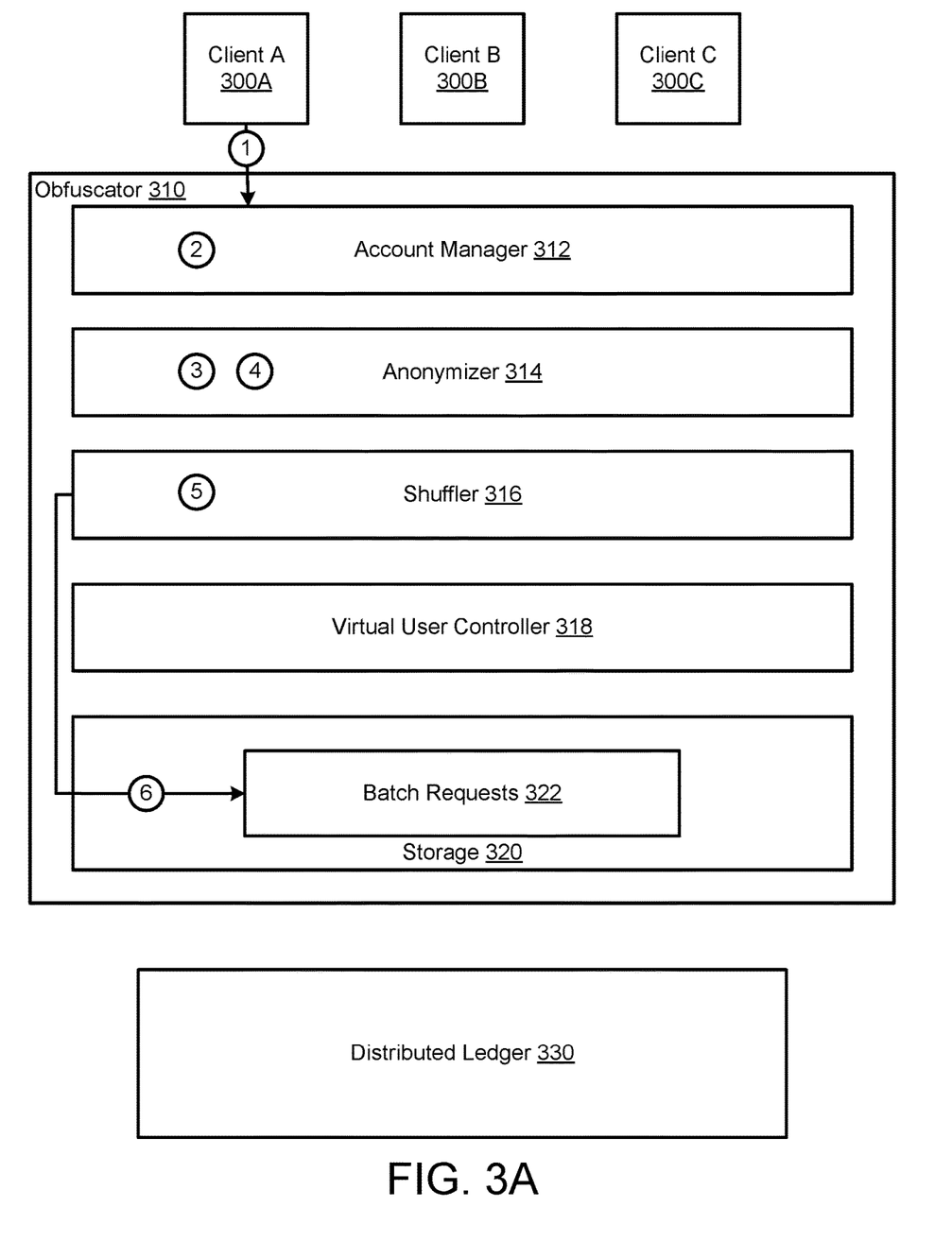
FIGS. 3A-3B show diagrams of examples in accordance with one or more embodiments disclosed herein.
Figure 3B:
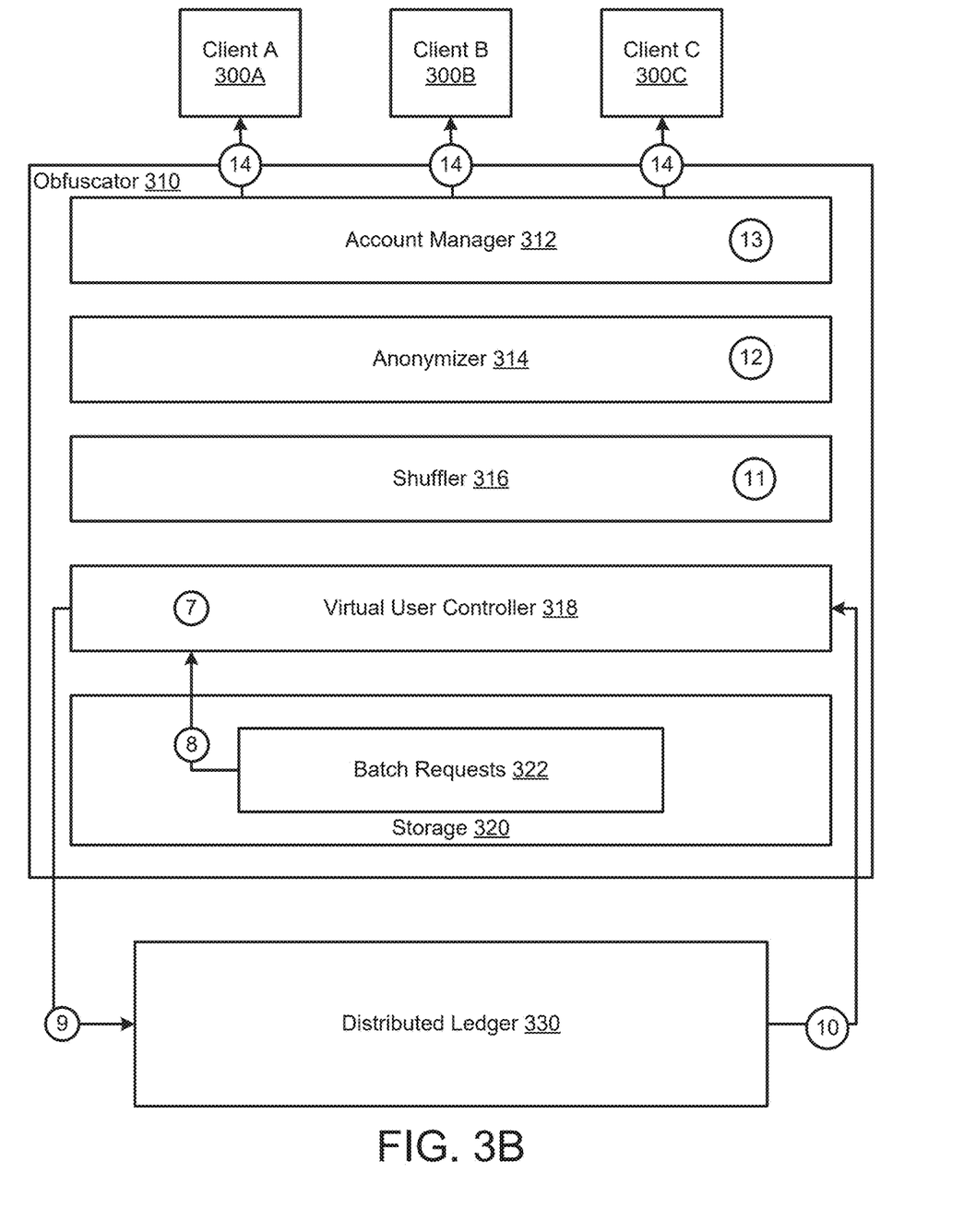

To further clarify embodiments of the invention, a non-limiting example is provided in FIGS. 3A-3B. FIGS. 3A-3B show a system similar to that illustrated in FIG. 1A. Actions performed by components of the illustrated system are illustrated by numbered, circular boxes interconnected, in part, using dashed lines. For the sake of brevity, only a limited number of components of the system of FIGS. 1A-1B are illustrated in FIGS. 3A-3B.

EXAMPLES

Consider a scenario as illustrated in FIG. 3A in which three clients are obtaining obfuscation services from an obfuscator (310) for performing transactions in a distributed ledger (330). The three clients include client A (300A), client B (300B), and client C (300C). At a first point in time, client A sends a transaction request to the account manager (312) of the obfuscator (310) [1]. The transaction request is for a software package offered by a node included in the distributed ledger (130). The account manager (312) then performs verification on the transaction request [2]. The account manager (312) compares the client information included in the transaction request with corresponding client information included in the account manager information and determines that the client information matches.

The account manager (312) then checks that the available funds associated with client A (300A) exceed the amount required to purchase the asset targeted by the transaction request. Client A (300A) previously submitted the necessary monetary funds using an out-of-band network communication channel between client A (300A) and the obfuscator (310). Therefore, the account manager (312) determines that the verification associated with the transaction request is successful. The anonymizer (314) of the obfuscator (310) then generates an anonymous transaction request using the transaction request by removing the client information from the transaction request and assigning an anonymous transaction request identifier to the anonymous transaction request [3]. The anonymizer (314) then updates the client payload mappings based on the anonymous transaction request to specify that the anonymous transaction request is associated with client A (300A) [4].

The shuffler (316) of the obfuscator (310) then shuffles the anonymous transaction request with a batch of requests to generate a shuffled index and shuffle mappings [5]. The shuffler (316) randomly swaps the anonymous transaction request identifiers included in an original logical index that include references to the physical data associated with the anonymous transaction requests stored in a corresponding physical index to generate the shuffled index. The shuffler (316) then generates shuffle mappings that specify the swaps used to generate the shuffled index. After shuffling, the shuffler stores the shuffled index and the shuffle mappings in the storage (320) with the batch requests (322) [6]. The batch requests (322) include previously obtained anonymous transaction requests and the anonymous transaction request associated with the transaction request obtained in [1].

Turning now to FIG. 3B, the virtual user controller (318) of the obfuscator (310) identifies a batch request transmission event [7]. The batch request transmission event includes the batch of request exceeding a configurable batch request threshold, which was the result of the generation of the anonymous transaction request in FIG. 3A. In response identifying the batch request transmission event, the virtual user controller obtains, using the shuffle index, the batch requests (322) [8]. The virtual user controller (318) then submits the batch of requests to the distributed ledger (330) using three virtual users [9]. The virtual users also submit payments associated with the anonymous transaction requests included in the batch requests using a one-time virtual card for each transaction request generated using the available funds associated with the clients (300A, 300B, 300C). In response to obtaining the anonymous transaction requests, the distributed ledger (330) generates asset information associated with the targeted assets and sends the asset information to back to the virtual users [10].

After obtaining the asset information, the shuffler (316) uses the shuffle mappings to revert the shuffle index back to the original logical index and identifies the asset information associated with each anonymous transaction request included in the batch requests (322) [11]. The anonymizer (314) then uses the client payload mappings to identify, based on the anonymous transaction requests, the asset information associated with each client (300A, 300B, 300C) [12]. The identified asset information associated with each client is transmitted to the account manager [13]. The account manager then provides the asset information to each client, client A (300A), client B (300B), and client C (300C) [14]. The clients may then use the asset information to access their targeted assets, including client A (300A) using the asset information to download the desired software package.

End of Examples

Figure 4:
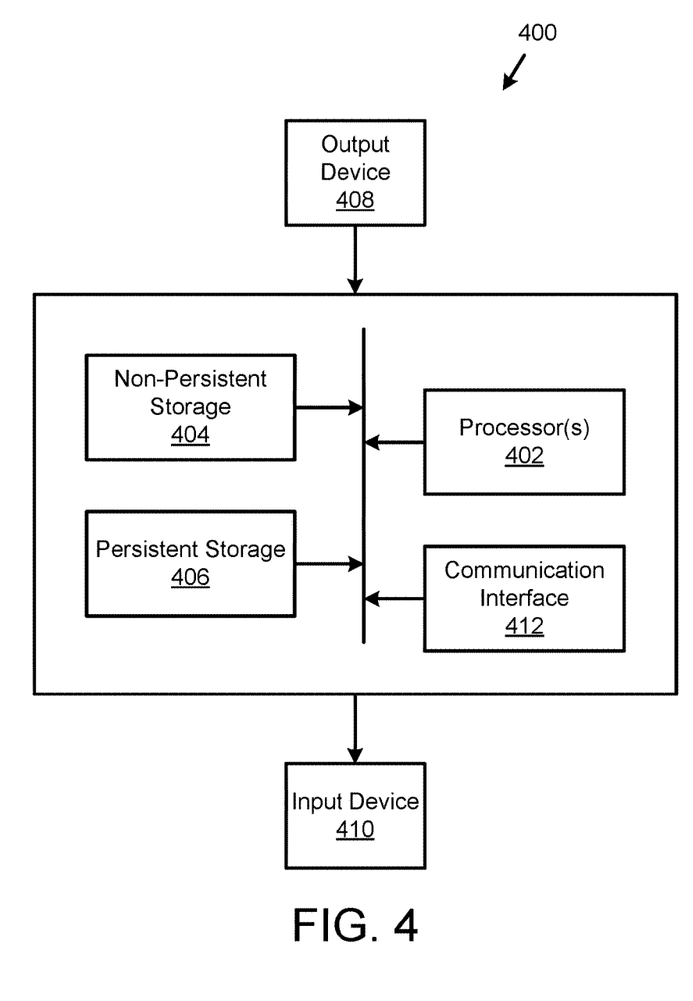
FIG. 4 shows a diagram of an exemplary computing device in accordance with one or more embodiments disclosed herein.

Embodiments disclosed herein may be implemented using computing devices and/or computing systems. FIG. 4 shows a diagram of an exemplary computing device in accordance with one or more embodiments disclosed herein. Computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, computer processor(s) (402) may be an integrated circuit for processing instructions. For example, the computer processor(s) may be one or more cores or micro-cores of a processor. Computing system (400) may also include one or more input devices (410), such as a touchscreen, keyboard, mouse, microphone, touchpad, electronic pen, or any other type of input device. Further, communication interface (412) may include an integrated circuit for connecting computing system (400) to a network (not shown) (e.g., a local area network (LAN), a wide area network (WAN) such as the Internet, mobile network, or any other type of network) and/or to another device, such as another computing system.

In one embodiment disclosed herein, computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (402), non-persistent storage (404), and persistent storage (406). Many different types of computing devices exist, and the aforementioned input and output device(s) may take other forms.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium. As discussed above, embodiments disclosed herein may be implemented using computing devices.

As used herein, an entity that is programmed to or configured to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

The problems discussed throughout this disclosure should be understood as being examples of problems solved by embodiments disclosed herein and the embodiments disclosed herein should not be limited to solving the same/similar problems. The disclosed embodiments are broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing transactions in a distributed ledger, comprising:
    obtaining a transaction request from a client;
    in response to obtaining the transaction request:
        verifying client information associated with the client and the transaction request;
        anonymizing the transaction request to generate an anonymous transaction request;
        updating client payload mappings based on the anonymous transaction request;
        shuffling the anonymous transaction request with a batch of requests to generate a shuffle index;
        assigning the batch of requests to virtual users to generate virtual user assignments; and
        processing the transaction request using the batch of requests.

2. The method of claim 1, wherein the shuffle index specifies a mapping between a logical index referencing the batch of requests and a physical index comprising the batch of requests.

3. The method of claim 1, wherein a virtual user of the virtual users is assigned a portion of the requests included in the batch of requests.

4. The method of claim 1, wherein processing the transaction request comprises:
    identifying a batch request transmission event;
    in response to identifying the batch request transmission event:

submitting the batch of requests to the distributed ledger using the virtual users;

obtaining, in response to the submitting, asset information associated with the batch of requests;

identifying anonymous transaction requests associated with the asset information using shuffle mappings and the shuffle index;

identifying a plurality of clients associated with the asset information based on the anonymous transaction requests and the client payload mappings; and providing the asset information to the plurality of clients.

5. The method of claim 4, wherein the batch request transmission event comprises the batch of requests exceeding a configurable batch request threshold.

6. The method of claim 4, wherein the batch request transmission event comprises exceeding a request transmission delay period since a previous batch of requests were submitted.

7. The method of claim 4, wherein the asset information comprises access information that enables the clients to access assets.

8. A non-transitory computer readable medium comprising computer readable program code, which when executed by a computer processor enables the computer processor to perform a method for managing transactions in a distributed ledger, the method comprising:

obtaining a transaction request from a client;

in response to obtaining the transaction request:
  verifying client information associated with the client and the transaction request;
  anonymizing the transaction request to generate an anonymous transaction request;
  updating client payload mappings based on the anonymous transaction request;
  shuffling the anonymous transaction request with a batch of requests to generate a shuffle index;
  assigning the batch of requests to virtual users to generate virtual user assignments; and
  processing the transaction request using the batch of requests.

9. The non-transitory computer readable medium of claim 8, wherein the shuffle index specifies a mapping between a logical index referencing the batch of requests and a physical index comprising the batch of requests.

10. The non-transitory computer readable medium of claim 8, wherein a virtual user of the virtual users is assigned a portion of the requests included in the batch of requests.

11. The non-transitory computer readable medium of claim 8, wherein processing the transaction request comprises:

identifying a batch request transmission event;

in response to identifying the batch request transmission event:
  submitting the batch of requests to the distributed ledger using the virtual users;
  obtaining, in response to the submitting, asset information associated with the batch of requests;
  identifying anonymous transaction requests associated with the asset information using shuffle mappings and the shuffle index;
  identifying a plurality of clients associated with the asset information based on the anonymous transaction requests and the client payload mappings; and
  providing the asset information to the plurality of clients.

12. The non-transitory computer readable medium of claim 11, wherein the batch request transmission event comprises the batch of requests exceeding a configurable batch request threshold.

13. The non-transitory computer readable medium of claim 11, wherein the batch request transmission event comprises exceeding a request transmission delay period since a previous batch of requests were submitted.

14. The non-transitory computer readable medium of claim 11, wherein the asset information comprises access information that enables the clients to access assets.

15. A system for managing transactions in a distributed ledger, comprising:

a distributed ledger; and an obfuscator, comprising a processor and memory, programmed to:
  obtain a transaction request from a client;
  in response to obtaining the transaction request:
    verify client information associated with the client and the transaction request;
    anonymize the transaction request to generate an anonymous transaction request;
    update client payload mappings based on the anonymous transaction request;
    shuffle the anonymous transaction request with a batch of requests to generate a shuffle index;
    assign the batch of requests to virtual users to generate virtual user assignments; and
    process the transaction request using the batch of requests.

16. The system of claim 15, wherein the shuffle index specifies a mapping between a logical index referencing the batch of requests and a physical index comprising the batch of requests.

17. The system of claim 15, wherein a virtual user of the virtual users is assigned a portion of the requests included in the batch of requests.

18. The system of claim 15, wherein processing the transaction request comprises:

identifying a batch request transmission event;

in response to identifying the batch request transmission event:
  submitting the batch of requests to the distributed ledger using the virtual users;
  obtaining, in response to the submitting, asset information associated with the batch of requests;
  identifying anonymous transaction requests associated with the asset information using shuffle mappings and the shuffle index;
  identifying a plurality of clients associated with the asset information based on the anonymous transaction requests and the client payload mappings; and
  providing the asset information to the plurality of clients.

19. The system of claim 18, wherein the batch request transmission event comprises the batch of requests exceeding a configurable batch request threshold.

20. The system of claim 18, wherein the batch request transmission event comprises exceeding a request transmission delay period since a previous batch of requests were submitted.

* * * * *